INVENTOR
ALLISON W. BLANSHINE

AGENT

INVENTOR
ALLISON W. BLANSHINE
Walter V. Wright
AGENT

INVENTOR.
ALLISON W. BLANSHINE
BY
Walter V. Wright
AGENT

United States Patent Office 3,135,307
Patented June 2, 1964

3,135,307
FORAGE CHOPPER HAVING ADJUSTABLE
CUTTERHEAD
Allison W. Blanshine, Lititz, Pa., assignor to Sperry Rand
Corporation, New Holland, Pa., a corporation of
Delaware
Filed July 18, 1961, Ser. No. 124,838
5 Claims. (Cl. 146—120)

This invention relates to rotary cutters as employed, for example, in forage harvesters. More specifically it relates to improvements in the mounting of a forage chopper cutterhead.

One component of forage harvesters is a forage chopper unit which receives crop material, chops it into small pieces and discharges the pieces rearwardly, usually into a trailing wagon. Thus, the forage chopper units have two major functions: to chop crop material and to propel the material rearwardly with sufficient velocity to carry the material to a trailing wagon.

The chopper units comprise, generally, a horizontally disposed cylindrical housing having a front radial inlet and an upwardly and rearwardly directed discharge outlet. A stationary shear bar is mounted at the lower edge of the inlet. A cutterhead having radial knives is rotatable within the housing. The knives move downwardly past the shear bar and then rearwardly along the bottom arcuate portion of the housing toward the discharge outlet. The propulsion of the material through the discharge outlet comes partly from the centrifugal throwing action of the knives and partly from the air current generated by the fast moving knives and cutterhead. Light dry material may be largely carried by the air current, while wet heavy material is more likely to be propelled by the force imparted thereto by actual contact with the knives.

For proper operation and maximum efficiency of these mechanisms, there are two areas where proper operating clearance between the parts is of a critical nature. There must be proper clearance between the cutterhead knives and the fixed shear bar and there must be proper radial clearance between the cutterhead knives and the housing between the inlet opening and the outlet, or discharge opening. The radial clearance between the knives and the housing wall between the inlet and outlet should either remain constant or, preferably, progressively increase toward the outlet in order to prevent wedging of the material between the knives and housing. Cases are known where a decrease in the radial spacing toward the outlet has doubled the horsepower required to drive the cutterhead at proper speed.

On the other hand, if the radial spacing between the knives and this particular portion of the housing is too great, the air current generated within the housing is effected and may not properly convey light dry material. Of greater importance, however, is the fact that if the clearance is too great, material will hang over the edge of the cutterhead knives and drag over the housing causing an increase in the horsepower requirements and overheating of the housing due to the resulting friction.

While proper clearance is established in these areas when the unit is initially assembled, wear and sharpening of the knives during normal use changes this clearance and may result in the problems mentioned above. On most forage choppers the knives are radially adjustable on the cutterhead whereby as they wear, or are sharpened, they may be moved outwardly to re-establish proper clearance in the aforementioned areas. This is a tedious, time consuming operation which may have to be performed one or more times per cutting season by the average forage harvester uses. This represents undesirable down time when the machine may be urgently needed to harvest crops at their peak feed value.

It is the general object of this invention to provide an improved mounting for the cutterhead of a forage chopper.

It is an object of this invention to provide a forage chopper unit which will operate through an entire cutting season for the average user without requiring radial adjustment of the cutterhead knives.

It is another object of this invention to provide a forage chopper cutterhead which may be simultaneously adjusted relative to the fixed shear bar and the forage chopper housing.

It is an object of this invention to provide improved mounting means for the cutterhead of a forage chopper whereby the cutterhead may be simply and easily adjusted to maintain proper throwing action in compensation for wear or sharpening of the cutterhead knives.

It is another object of this invention to provide means for adjusting the cutterhead of a forage chopper whereby extremely fine adjustment is possible.

It is another object of this invention to provide a forage chopper cutterhead which is adjustable about a fixed pivot member whereby the cutterhead is positively supported during adjustment, and the knife edges are held parallel to the fixed shear bar.

These and other objects of this invention will be more fully explained in the following specification and drawings wherein.

Figure 1:
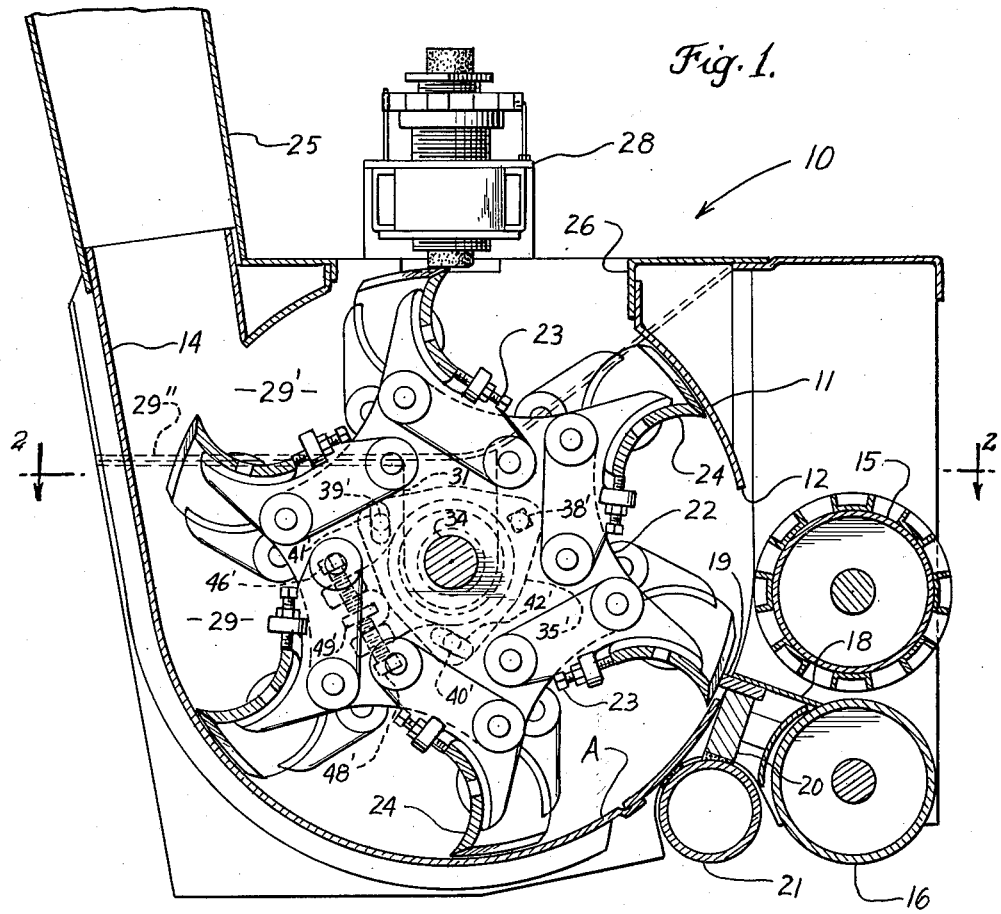
FIG. 1 is a fragmentary longitudinal sectional view of a forage harvester embodying a crop chopping unit constructed in accordance with the principles of this invention.

With reference to the drawings, particularly FIG. 1, reference numeral 10 represents, generally, the forage chopper unit of a forage harvester. It includes a generally cylindrical housing 11 having a forwardly disposed inlet 12 and an upwardly and rearwardly directed outlet, or discharge opening 14. Disposed forwardly of inlet 12 are horizontal upper and lower feed rolls 15 and 16, respectively. Extending rearwardly from feed roll 16 is an infeed platform 18 which defines the lower limit of inlet 12. A fixed shear bar 19 is disposed adjacent inlet 12 on the lower side thereof. Shear bar 19 is mounted on a support 20 which is carried by a cross frame member 21 of the forage harvester.

Disposed within cylindrical housing 11 is a cutterhead 22 which carries a plurality of radial knives. The knives may be radially adjusted relative to the cutterhead by operation of threaded members 23, as is well known in the art. The cutterhead is driven clockwise as seen in FIG. 1 whereby knives 24 move downwardly past inlet 12 and shear bar 19 and rearwardly over arcuate wall portion A of housing 11. The arcuate wall portion A of housing 11, extending between inlet 12 and outlet 14, is an area of primary concern to this invention. A discharge spout 25 extends upwardly and rearwardly from outlet 14 and normally directs the crop material discharged through outlet 14 rearwardly into a trailing wagon.

Housing 11 is provided with a top opening 26 over which is mounted, and through which is operable, a sharpening attachment 28. For the details and operation of sharpening attachment 28, reference may be made to U.S. Patent No. 2,788,623 issued April 16, 1957.

Figure 2:
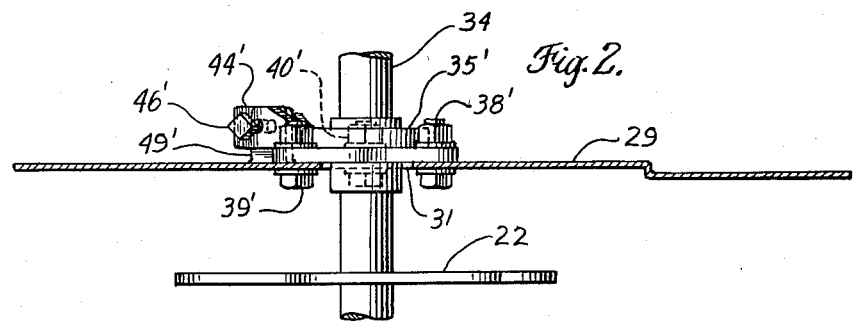
FIG. 2 is fragmentary sectional view taken on the line 2—2 of FIG. 1.
Figure 3:
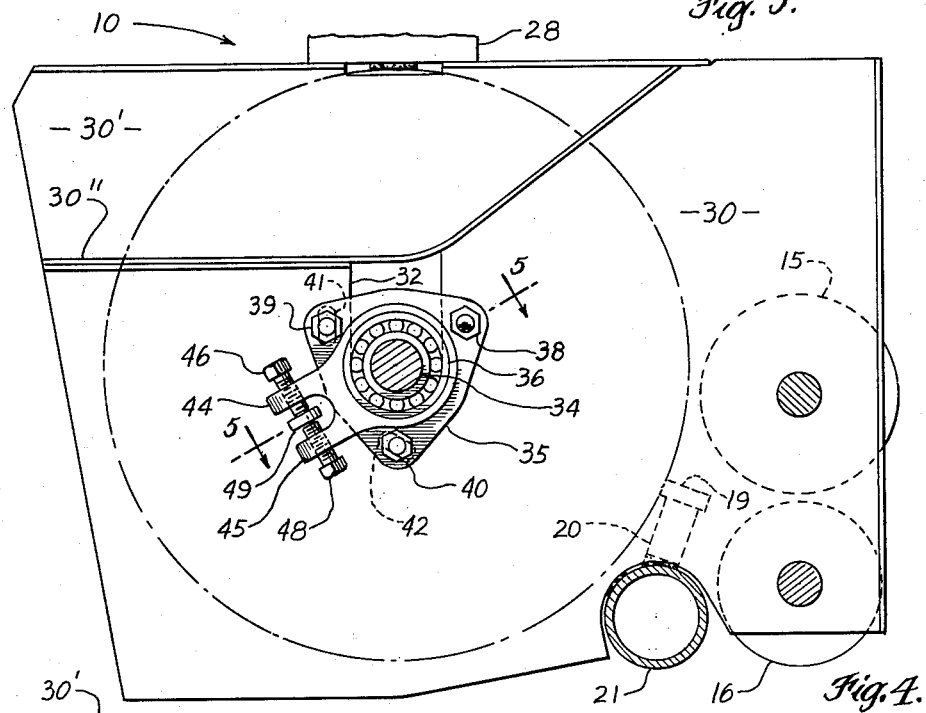
FIG. 3 is an end view of the crop chopping unit of FIG. 1.

Chopper housing 11 has composite side walls 29—29' and 30—30' which may be, respectively, seen in FIGS. 1 and 3. The composite parts of each wall are provided with mating flanges as seen at 29" and 30" in FIGS. 1 and 3, respectively. The flanges are interconnected by conventional removable fasteners, such as bolts, not shown, in order that the upper wall portions 29' and 30' may be removed from lower wall portions 29 and 30. Lower side wall portions 29 and 30 are provided with vertical slots 31 and 32, respectively, to accommodate shaft 34 of cutterhead 22. When it is necessary to remove cutterhead 22 from the machine, the upper portion of the housing, which is carried by upper side wall portions 29' and 30', may be removed to enable the cutterhead 22 to be lifted vertically out of the remainder of cylindrical housing 11. As seen in FIG. 2, one end of cutterhead shaft 34 projects laterally beyond side wall 29 whereby the cutterhead may be driven by conventional means not a part of this invention.

Figure 4:
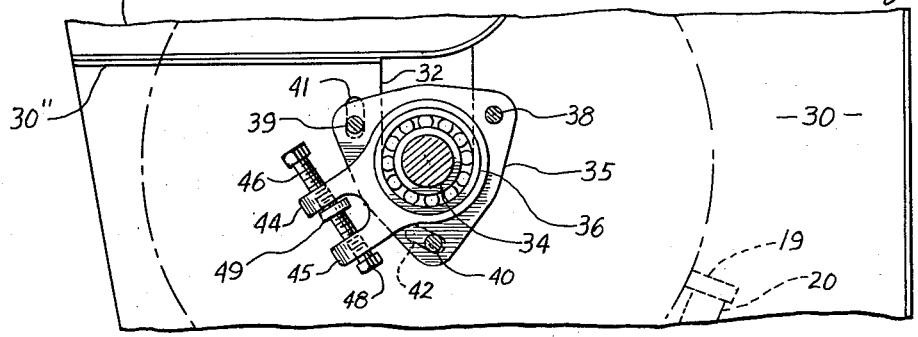
FIG. 4 is a fragmentary end view similar to FIG. 3, but showing the cutterhead in an adjusted position.
Figure 5:
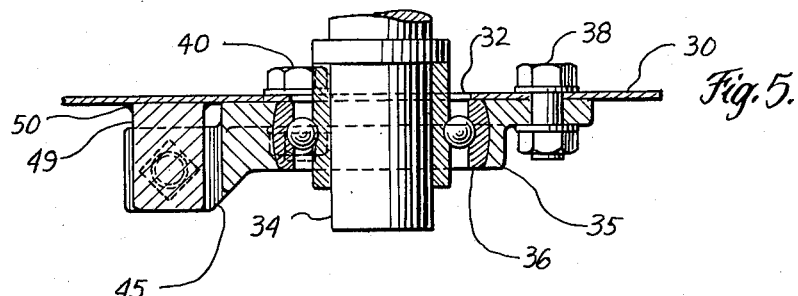
FIG. 5 is an enlarged fragmentary sectional view taken on the line 5—5 of FIG. 3.

The supporting structure for each of the two ends of cutterhead shaft 34 is identical. This will now be described in connection with the end of shaft 34 adjacent side wall 30 as seen in FIGS. 3–5. Identical parts at the other end of shaft 34 bear identical primed reference numerals in FIGS. 1 and 2. A generally triangular shaped bearing member 35 carries a conventional ball bearing 36. Ball bearing 36 receives the end of cutterhead shaft 34. Bearing member 35 is pivotally mounted on housing side wall 30 by a fixed pivot member, or bolt, 38. Two other bolts 39 and 40 are carried by bearing member 35 and extend, respectively, through slots 41 and 42 in housing side wall 30. Slots 41 and 42 are disposed concentrically about pivot member 38. Thus, when bolts 39 and 40 are loosened, bearing member 35 may be pivoted about bolt 38. When bolts 39 and 40 are tightened, bearing member 35 is locked to end wall 30 of the housing against pivotal movement about bolt 38. As seen in FIGS. 4 and 5, for example, bearing member 35 has a pair of lugs 44 and 45 formed integrally thereon. These lugs project rearwardly from bearing member 35 on the side of cutterhead shaft 34 opposite from fixed pivot member 38. Threaded adjusting members 46 and 48 are, respectively, threaded through lugs 44 and 45 and engage opposite sides of a lug 49 which may be welded, as shown at 50 in FIG. 5 or otherwise fixedly attached to housing end wall 30. When it is desired to swing bearing member 35, and thus cutterhead 22, counterclockwise about the axis of bolt 38, bolt 46 is turned out of lug 44 and bolt 48 is turned into lug 45. FIG. 4 shows bearing member 35 after it has been swung counterclockwise about bolt 38 from the position shown in FIG. 3. This movement occurs because the ends of bolts 46 and 48 abut the sides of lug 49 which is fixedly mounted on housing side wall 30. Previously mentioned vertical slots 31 and 32 in side walls 29 and 30 are large enough that the sides thereof do not touch cutterhead shaft 34 in any position to which it may be adjusted. This may be best seen in FIG. 1.

Figure 6:
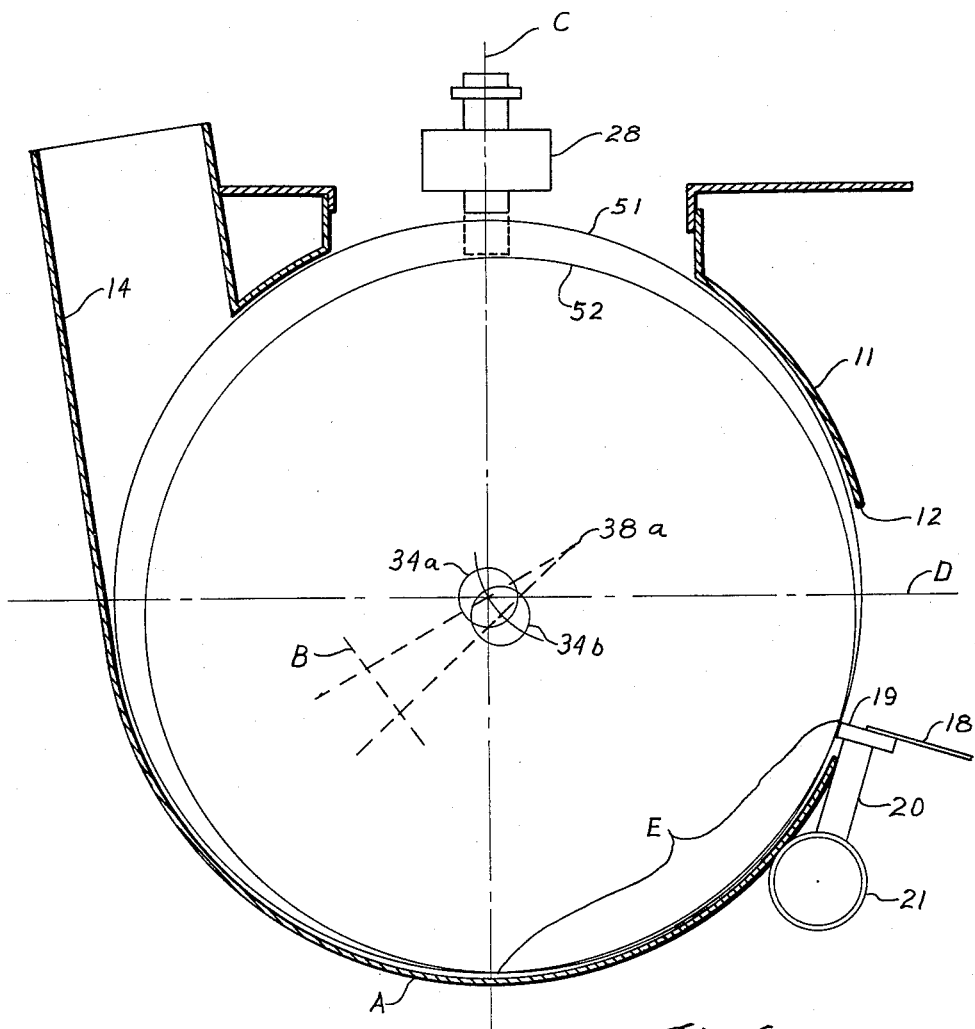
FIG. 6 is an enlarged diagrammatic view similar to FIG. 1.

For a better understanding of the theory of the operation of this device, reference may be made to FIG. 6 of the drawings. The circle 51 indicates the path of travel of the cutting edges of knives 24 before any knife wear or adjustment has occurred. The circle 52 indicates the path of travel of the cutting edges of knives 24 after they have been sharpened a maximum amount and after the cutterhead has been adjusted a maximum amount in compensation for the sharpening. Small circle 34a indicates the initial position of cutterhead shaft 34. As knife wear and sharpening reduce the diameter of circle 51 to that of circle 52, adjustment of bolts 46 and 48 along line B moves shaft 34 toward the position indicated at 34b. This swings the entire cutterhead about axis 38a which is the axis of bolt 38, forwardly toward shear bar 19 and simultaneously downwardly toward arcuate wall portion A of housing 11. Bolt 38, and therefore pivot axis 38a, is disposed forwardly of a vertical plane C through the axis of the cutterhead and upwardly from a horizontal plane D through the axis of the cutterhead. If no compensating adjustment of shaft 34 were made, the path of travel 52 of the reduced diameter cutterhead would be concentric to circle 51 and would therefore be spaced radially inwardly from shear bar 19 and arcuate wall portion A of housing 11 and the device would neither cut nor discharge material properly. If the cutterhead were adjusted along a straight line directly toward shear bar 19, proper cutting action could be maintained at shear bar 19 but the spacing between the knives and arcuate wall portion A of the housing would be excessive and the cut material would not be discharged satisfactorily.

With the disclosed cutterhead adjustment mechanism, there will be an area indicated by the letter E wherein knife path 52 actually lies slightly outside of path 51. This does not produce a wedging of the material between knives 24 and housing wall portion A, as might be expected, because the inclined leading faces of knives 24 drive material radially inwardly upon initial contact therewith as the knives pass shear bar 19. By the time the centrifugal force of the cutterhead returns this material outwardly to arcuate wall portion A of the housing, where wedging would occur, the knives have moved past area E. By thus making use of the area E wherein overlapping of the knife paths does no harm, this mechanism enables the cutterhead to be adjusted toward shear bar 19 without increasing the radial spacing between arcuate wall portion A and the knives 24 beyond an allowable limit further back in the housing toward outlet 14.

Of course, after sufficient sharpening of the knives has occurred, the knives will have to be moved radially outwardly on cutterhead 22 and the cutterhead shaft returned to its initial position. With the adjustment afforded by pivoted bearing members 35, however, this chopper unit may be operated through one entire cutting season before the knives need to be adjusted radially outwardly. Thus the knives may be set before the cutting season begins or after the cutting season is over and the machine need not be torn down for knife adjustment during the cutting season.

Since the supporting structure, including wall portions 29 and 30 which are formed on the same die, is identical at each end of cutterhead 22, the mounting bolts 38 lie on a common axis 38a. This axis is parallel to and spaced from the axis of cutterhead shaft 34 and the cutting edge of shear bar 19. Therefore, in addition to providing a support for the cutterhead 22 during adjustment, bolts 38 and 38' provide a reference axis about which the adjustment is made. This insures that shaft 34, and therefore the cutting edges of knives 24, will remain parallel to the cutting edge of shear bar 19 even though the cutterhead be adjusted.

It can also be seen in FIGS. 3 and 6 that the linear movement imparted to bearing member 35 by bolts 46 and 48 along line B is considerably greater than the forward and downward linear movement of the axis of shaft 34 in moving from position 34a to 34b. This comes as a result of the locating of adjusting bolts 46 and 48 on the opposite side of shaft 34 from fixed pivot point 38a.

The geometric advantage thus afforded by this adjustment mechanism enables extremely fine accurate adjustment of the cutterhead to be made. This is important in devices of this type because of the narrow tolerance range of the radial spacing between shear bar 19, housing wall portion A and knives 24. The extent of adjustment of the cutterhead and the difference in diameters of knife paths 51 and 52 is exaggerated in FIG. 6 relative to the size of housing 11. In actual practice the difference in diameters of paths 51 and 52 of the knives may be approximately 3/8 of an inch for an initial diameter of circle 51 of 18 inches. For these figures, the linear adjustment of shaft 34 would be approximately 1/4 of an inch. This movement of shaft 34 would be accomplished by 1/2 of an inch adjustment of bolts 46 and 48 along line B in FIG. 6. This adjustment, of course, would be made in smaller increments over a period of time as the knives were periodically sharpened.

The exaggeration, in FIG. 6, of the difference between the diameters of the paths of travel of the knives before and after sharpening also produces, in this figure, an arc length E which is unrealistically long. In FIG. 6 the arc E covers approximately 70° of the housing rearwardly from shear bar 19. In actual practice, for the figures mentioned above, arc E would not extend rearwardly from shear bar 19 more than 30° on the housing.

This cutterhead mounting mechanism provides fine, accurate adjustment of the rotary cutterhead, relative to both shear bar 19 and arcuate wall portion A of housing 11, which normally enables the cutterhead to both cut and discharge material satisfactorily throughout an entire cutting season without the necessity of radially adjusting knives 24.

While this invention has been described in connection with a particular embodiment thereof, it will be understood that it is capable of further modification and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A forage chopper comprising a generally cylindrical horizontally disposed housing having side walls, said housing having a forward inlet, a rearward outlet and an arcuate wall portion therebetween, a shear bar mounted adjacent said inlet, a cutterhead within said housing and having a plurality of knives mounted thereon, a pair of bearing members each of which rotatably carries one end of said cutterhead for rotation about its own axis to move said knives in a circular path having a predetermined spaced relationship to said shear bar and said arcuate wall portion of the housing, and means to adjust said bearing members to maintain said spaced relationship between the path of travel of said knives and said shear bar and arcuate wall portion of the housing in compensation for wear and sharpening of said knives, said means to adjust said bearing members comprising pivot means mounting said bearing members respectively on said side walls, said pivot means being disposed forwardly of a vertical plane through the axis of said cutterhead and above a horizontal plane through the axis of said cutterhead and means extending between each side wall of the housing and the bearing member mounted thereon to simultaneously pivot said cutterhead downwardly toward the arcuate wall portion of said housing and forwardly toward said shear bar about said pivot means.

2. A forage chopper as recited in claim 1 wherein means extend between each side wall of the housing and the bearing member mounted thereon for locking the bearing members against movement relative to said housing.

3. A forage chopper comprising a cylindrical housing having a pair of side walls, said housing having a forward inlet, a rearward outlet and an arcuate wall portion therebetween, a shear bar mounted adjacent said inlet, a cutterhead disposed within said housing and having a plurality of knives mounted thereon, a pair of bearing members, each of said bearing members rotatably carrying one end of said cutterhead for rotation about its own axis to move said knives in a circular path having a predetermined spaced relationship to said shear bar and said arcuate wall portion of the housing, pivot means mounting each of said bearing members respectively on one of said side walls for pivotal movement about an axis parallel to and spaced from the axis of said cutterhead, said pivot means being disposed forwardly of a vertical plane through the axis of said cutterhead and above a horizontal plane through the axis of said cutterhead, each of said side walls having a plug projecting therefrom adjacent said bearing member, a threaded member for each of said bearing members, each of said threaded members engaging one of said side wall lugs and one of said bearing members and pivoting its associated bearing member downwardly and forwardly about its pivotal mounting means upon rotation of the threaded member in one direction to simultaneously move said knives toward said arcuate wall portion of said housing and said shear bar to maintain said predetermined space relationship therebetween in compensation for wear and sharpening of said knives.

4. A forage chopper as recited in claim 3 wherein the threaded adjusting members and the pivot means mounting the bearing members on the side walls respectively engage said bearing members on opposite sides of the axis of said cutterhead whereby the extent of linear movement imparted to said bearing members by said threaded adjusting members is greater than the linear movement of said bearing members at the axis of said cutterhead thereby enabling fine adjustment of said cutterhead.

5. A forage chopper as recited in claim 3 wherein at least one slot is provided in each side wall of said housing, said slot being concentric with said bearing pivot means, a threaded fastener carried by each of said bearings and extending through said slot, for locking said bearing members against movement relative to said side walls.

References Cited in the file of this patent

UNITED STATES PATENTS

| | | |
|---|---|---|
| 1,039,490 | Coldwell | Sept. 24, 1912 |
| 1,683,042 | Krogan | Sept. 4, 1928 |
| 2,376,618 | Paradise et al. | May 22, 1945 |
| 2,476,177 | Bloom et al. | July 12, 1949 |
| 2,681,065 | Wordon | June 15, 1954 |
| 2,829,692 | Innocenti | Apr. 8, 1958 |
| 2,962,028 | Kahle | Nov. 29, 1960 |